June 2, 1964  R. E. D. ANDERSON ETAL  3,135,909
REGULATED VOLTAGE CONVERTER CIRCUIT
Filed Dec. 14, 1961
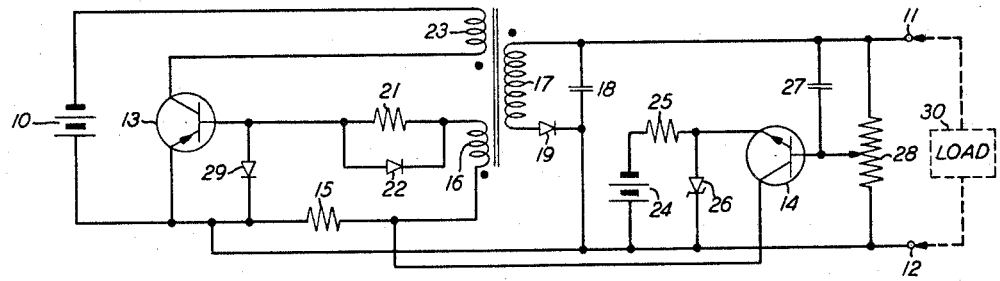
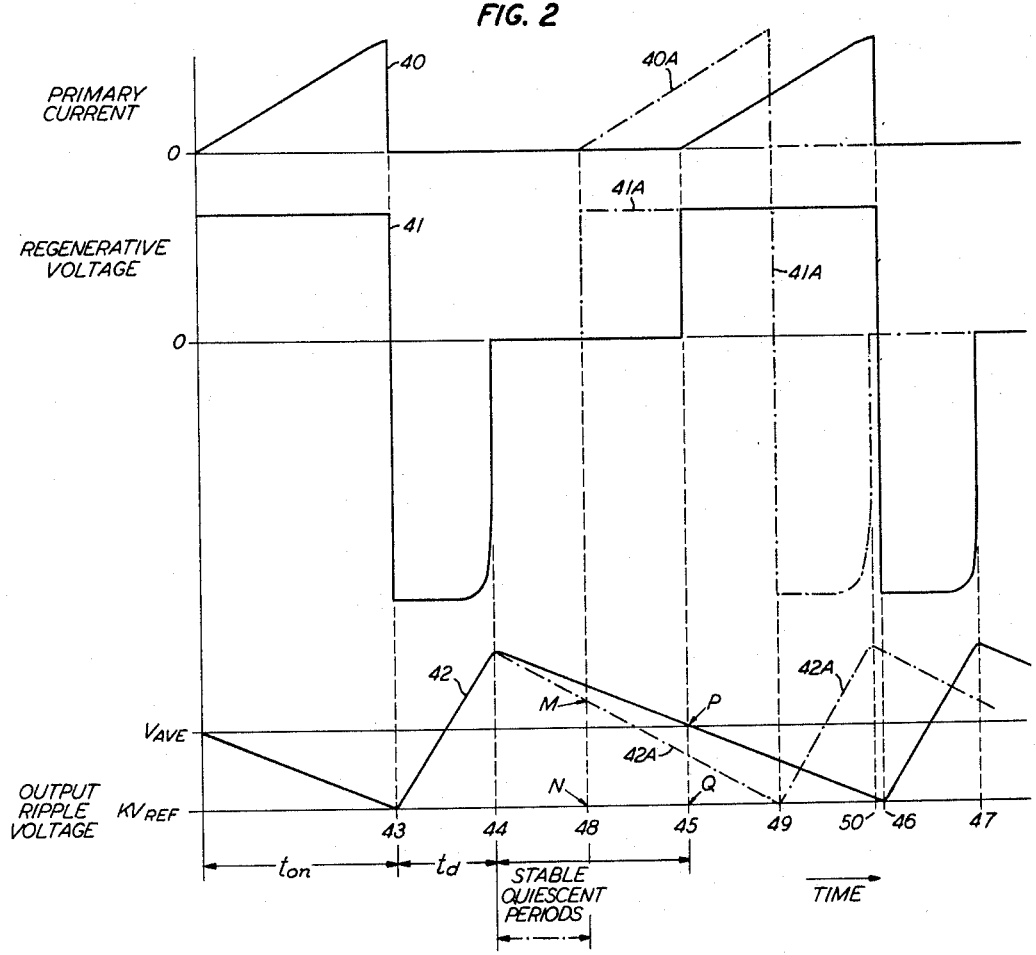
INVENTORS R. E. D. ANDERSON
R. J. PROJAIN United States Patent Office 3,135,909
Patented June 2, 1964

3,135,909
REGULATED VOLTAGE CONVERTER CIRCUIT
Robert E. D. Anderson, Florham Park, N.J., and Richard
J. Projain, Syosset, N.Y., assignors, by direct and mesne
assignments, to Bell Telephone Laboratories, Incorporated, New York, N.Y., a corporation of New York
Filed Dec. 14, 1961, Ser. No. 159,243
3 Claims. (Cl. 321—2)

This invention relates to systems for utilizing an available direct-current voltage to produce a different direct-current voltage and, more particularly, to semi-conductor oscillator systems for producing a change in direct-current voltage level.

In such voltage conversion systems, a switching element is used to produce alternating currents from the available direct-current input voltage. These alternating currents are used to induce alternating voltages in an inductive circuit; then the induced alternating voltages are rectified and filtered to produce a direct-current output voltage.

Semiconductor devices such as the transistor have proved to be ideal switching elements for voltage converter systems when used with regenerative feedback.

In a semiconductor ringing choke converter circuit, energy is stored in the magnetic field of the inductive circuit while the semiconductor switching device is in a low impedance condition and then delivered from the magnetic field to the output circuit while the semiconductor switching element is in a high impedance condition.

Heretofore, ringing choke converter circuits have usually been regulated by varying the peak current in the inductive circuit and hence the energy stored in the magnetic field during each cycle. To do this, it is necessary to vary the length of time the semiconductor switching element remains turned on, that is, in its low impedance condition. For instance, as the energy requirements of the load increase, the time the switching element is turned on is increased. As a result, the peak current in the inductive circuit and the stored energy of the magnetic field is increased. A collateral consequence is that the frequency of operation tends to decrease. Thus the philosophy of this approach is to satisfy the increased demand of the load for energy with bigger bursts of energy, even though the bursts occur less often than at higher loads.

Generally speaking, the greater the amount of energy delivered in one cycle of operation of a ringing choke converter circuit, the greater will be the ripple voltage, that is, the cyclical fluctuation of the output voltage, even if the average value of the output voltage does not change. Another characteristic of this mode of control is that the operating frequency can become indefinitely high as the energy requirements of the load decrease. An increase in eddy current and hysteresis energy losses in the inductive circuitry results.

It is therefore an object of the invention to conserve energy in semiconductor oscillator circuits.

It is a further object of the invention to reduce hysteresis and eddy current losses as the energy requirements of the load decrease in a ringing choke converter circuit.

A further object of the invention is to devise a system for regulating a ringing choke converter circuit in which the cyclical fluctuations of the output voltage are stabilized as the energy requirements of the load vary.

It is a still further object of the invention to improve the direct-current voltage regulation of ringing choke converter circuits.

Accordingly, applicants have recognized that an altogether different approach to the regulation of a ringing choke converter circuit is possible. The basic concept is to satisfy increasing energy requirements of the load by delivering bursts of energy at an increasing frequency while holding constant the amount of energy delivered to the output circuit by each burst. The ripple voltage will then remain at that level which is associated with a burst of that size, the operating frequency and thus hysteresis and eddy current losses will decrease with decreasing energy delivered to the load and will increase with definite limits with increasing energy delivered to the load, and the circuit will have inherent overload protection.

This new control concept is achieved by providing the inductive circuit of the converter circuit with a stable quiescent state after the delivery of electrical energy from the magnetic field of the inductive circuit to the output circuit is complete, and by shortening the duration of the quiescent state as the average output voltage tends to decrease and lengthening the duration of the quiescent state as the average output voltage tends to increase. This stable state is achieved by apportioning the circuit parameters in a manner which will be more fully developed hereinafter.

According to another feature of the invention, the maintenance of the stable quiescent state of the semiconductor switching device is facilitated by providing a higher impedance in the regenerative feedback loop of the semiconductor switching device during energy delivery from the magnetic circuit to the output circuit, which immediately precedes the quiescent stable state, than the impedance of the regenerative feedback loop during the time that energy is being stored in the magnetic field of the inductive circuit. The latter impedance may then be made much lower than otherwise possible, allowing an increase in the internal damping of the regenerative feedback winding of the inductive circuit to prevent turn-on of the semiconductor switching device by parasitic oscillations caused by the distributed capacitance of the regenerative feedback winding without a turn-on signal from the feedback control circuit.

Another advantage of the feature of the invention just described is that power losses in the resistance of the regenerative feedback loop are minimized.

According to still another feature of the invention, variation of the amount of energy which is stored in the magnetic field during each cycle of operation is inhibited by allowing changes in the impedance of the regenerative feedback loop of the semiconductor switching device only before and after the portion of the cycle during which energy is being stored in the magnetic field.

Other objects, features, and advantages of the invention will become apparent from the following detailed description in conjunction with the drawings.

FIG. 1 is a schematic and block diagrammatic illustration of the preferred embodiment of the invention.

FIG. 2 shows curves which are useful in explaining the theory and operation of the invention.

In FIG. 1 input voltage 10 is the available direct-current voltage from which it is desired to obtain a different direct-current voltage at terminals 11 and 12. Transistor 13 has emitter, collector, and base electrodes. The emitter and collector electrodes, primary inductive winding 23 and input voltage 10 are connected to a closed series circuit. The orientation of transistor 13 with respect to input voltage 10 depends upon its conduction type. The emitter and base electrodes, the parallel combination of resistance 21 and diode 22, regenerative inductive winding 16, and resistance 15 are connected in a closed series circuit. Diode 22 is oriented to carry current when transistor 13 is forward-biased, that is, in its low impedance condition. Diode 29 is connected directly from base to emitter of transistor 13 and oriented to conduct when reverse voltages, that is, voltages opposing conduction of transistor 13, are applied to its base-emitter junction.

In the preferred embodiment of FIG. 1, transistor 13 is a PNP junction transistor, but it could equally well be an NPN junction transistor or any other semiconductor amplifying device with at least three electrodes. Its essentials are that it has two terminals, corresponding to the emitter and collector electrodes of transistor 13, between which a high impedance condition and a low impedance condition can be made to appear and that it has two terminals, corresponding to the emitter and base electrodes of transistor 13, between which a feedback voltage or current of a polarity to be regenerative can be connected with regenerative effect. PNP junction transistor 13 has the capability of producing a strongly regenerative effect. A more detailed description of the fabrication and characteristics of transistors may be found in United States Patent 2,569,347, issued September 25, 1951, for the invention of W. Shockley.

There is electromagnetic coupling between primary inductive winding 23 and regenerative inductive winding 16 and output inductive winding 17. The coupling is strengthened by placing all three windings on a ferromagnetic core. The switching action of transistor 13 is made highly regenerative by connecting regenerative winding 16 so that its induced voltage biases the base-emitter junction toward its low impedance condition when the induced voltage of winding 23 opposes input voltage 10. The regenerative action of this loop insures that the transistor 13 will always operate in one of its two most efficient operating modes.

Rectifying junction 19, output inductive winding 17, and filtering capacitor 18 are connected in a closed loop. The output voltage appears across capacitor 18. In the embodiment shown, rectifying junction 19 is oriented to cause the circuit to operate as a ringing choke converter; rectification occurs only during the period when transistor 13 is in its state of low or no current conduction, that is, turned off. Rectifying junction 19 might also be given the other polarity, in which case the circuit would operate as a transformer-coupled converter. Corresponding changes are suggested hereinafter. For a more detailed description of the development of both branches of the art, see Wolfendale, The Junction Transistor and Its Application, Macmillan, 1958, pp. 321–379.

Voltage divider 28 and load 30 are connected in parallel with capacitor 18 across output terminals 11 and 12.

Transistor 14 has its base or control electrode connected to voltage divider 28 in order to sense a selected part of the output voltage. Since the emitter of transistor 14 is connected to the anode of Zener diode 26, which is energized by battery voltage 24 in series with resistor 25 and which has its cathode connected to terminal 12, the resulting collector current of transistor 14 will be directly related to the difference between the portion of the output voltage from the base of transistor 14 to terminal 12 and the reference voltage across Zener diode 26. Capacitor 27 is connected from the base of transistor 14 to output terminal 11 to modify the portion of the output voltage from the base of transistor 14 to terminal 12 in response to the output voltage fluctuation which is not associated with the direct-current voltage comparison in the emitter-base circuit of transistor 14. Its capacitance value and the resistance value between the base of transistor 14 and output terminal 12 are preferably proportioned to constitute a differentiating circuit, as will be more fully described hereinafter.

To complete the feedback control loop from the output circuit to the input circuit, the collector of transistor 14 and output terminal 12 are connected to opposite sides of resistor 15 so that the collector current of transistor 14 flows through resistor 15 in a direction to bias transistor 13 toward conduction. This relationship remains the same regardless of the position of resistor 15 among the components of the regenerative feedback circuit.

Since transistor 14 is merely a comparator and actuator combined, its function might be performed by any number of elements designed to give amplification and isolation of the output voltage from the regenerative feedback loop. The voltages to be compared are merely opposed in the input circuit of such elements.

If rectifying junction 19 is reconnected to make the circuit a transformer-coupled circuit, then the relative polarity of voltages in the output circuit will be reversed and this might be compensated for by a number of ways, but one obvious way of making the change in the output circuit is to change the conduction type of transistor 14. Thus, it would become a PNP transistor instead of an NPN transistor. The connections of its collector and terminal 12 to resistor 15 must then be reversed and biasing changes made.

Further, any other means might be used to supply a constant reference voltage instead of battery 24, resistor 25, and Zener diode 26. In particular, battery voltage 24 can be replaced by input voltage 10 by connecting the end of resistor 25 opposite Zener diode 26 to the negative terminal of input voltage 10.

In operation, the available voltage from source 10 is applied to switching transistor 13 and primary inductive winding 23. The object is to obtain a different well-regulated direct-current voltage at terminals 11 and 12 as switching transistor 13 alternates between high and low impedance states.

After the circuit has been in operation for some time, switching transistor 13 is turned on by the feedback control circuit when the potential of the base electrode of control transistor 14, which is connected to a preselected contact point on voltage divider 28, becomes less negative than the potential of the emitter electrode of control transistor 14, which is the reference voltage across Zener diode 26. Then a base-to-emitter current will flow in transistor 14, thereby lowering its impedance; and a corresponding current will flow from the collector to the emitter terminal of transistor 14, through the Zener diode 26, and back to the collector through resistor 15 in the regenerative feedback circuit of switching transistor 13. The voltage produced by the current through resistor 15 is of a polarity to tend to forward-bias the emitter-base junction of switching transistor 13. As base current starts to flow in switching transistor 13, its emitter-to-collector impedance will be reduced and input voltage 10 will produce an increasing current in primary winding 23. As the current in inductive winding 23 increases, a voltage is induced in regenerative feedback winding 16 with a polarity which tends to increase the base current flow of transistor 13. This regenerative action quickly drives the emitter-collector impedance of switching transistor 13 toward its minimum value, and transistor 13 enters a state of operation commonly called saturation. In this state the collector current is less than the maximum obtainable collector current for the then-existing value of base current and the loop gain of transistor 13 and its associated regenerative feedback circuit has once again fallen below unity after the brief instant of strongly regenerative action involved in turning on transistor 13.

Experience has shown that current will increase in primary inductive winding 23 in a nearly linear fashion as illustrated in the first portion of curve 40 of FIG. 2. The regenerative feedback voltage will be essentially constant as illustrated in the first portion of curve 41 of FIG. 2. During this portion of the cycle, the polarity of the induced voltage in output inductive winding 17 is such that it is not rectified by rectifying junction 19; and therefore the voltage across filtering capacitor 18, voltage divider 28, and load 30 will continue to decrease as shown in the first portion of curve 42 of FIG. 2. Eventually, the collector current of switching transistor 13 attains the maximum value corresponding to the then-existing base current of transistor 13. It is commonly said that transistor 13 comes out of saturation at this point. Since maximum collector current for that base current has been reached, the current in primary winding 23 can no longer increase at a rate sufficient to maintain an induced voltage in regenerative feedback winding 16 which can sustain the aforesaid base current. At this point, corresponding to time 43 of the curves of FIG. 2, a decrease in the current in primary winding 23 is commenced and a highly regenerative switch-off of transistor 13 results.

The beginning of the collapse of the magnetic field of primary winding 23 reverses the induced voltages in regenerative winding 16 and output winding 17. The voltage of output winding 17 now has a polarity which is rectified by rectifying junction 19. The electromagnetic energy previously stored in the magnetic field is now delivered to filtering capacitor 18 in the output circuit.

The energy now delivered to filtering capacitor 18 should be a very small proportion of the energy stored in its electric field at the immediately preceding instant of time. This proportion determines the percentage output ripple voltage, since the energy storage of a capacitor is proportional to the square of the potential across it. It is readily seen that, since energy must be delivered in bursts, the ripple voltage cannot be entirely eliminated.

However, relative insignificance of the ripple voltage means that filtering capacitor 18 has a pronounced clamping effect on the terminal voltage of output winding 17. The terminal voltage of regenerative feedback winding 16 will be correspondingly flat, as illustrated by the portion of curve 41 between points 43 and 44 in FIG. 2. A rounding off of both curves 41 and 42 occurs at point 44 of FIG. 2 as the stored energy of the magnetic circuit approaches zero.

The invention utilizes the unavoidable ripple voltage to regulate the average value of the direct-current component of the output voltage by providing, and varying the duration of, a stable quiescent state of the inductive circuit, consisting of windings 16, 17, and 23, after the energy delivery to filtering capacitor 18 is complete. During both the energy delivery period and the quiescent period, switching transistor 13 is "off" or in a state of low current conduction. Thus, it might be said that the "off" time of transistor 13 is being controlled, even though part of that "off" time, the energy delivery time, cannot be completely eliminated. To obtain the stable state of the inductive circuit, it is necessary that, for all loads which are to be supplied with a regulated voltage, the increase of the voltage across filtering capacitor 18 during the time energy is being delivered to it from the magnetic field must be more than the decrease in voltage across it while energy is being stored in the magnetic field, that is, while transistor 13 is turned on. When this condition is satisfied, there must occur an initial decrease in the output voltage after the energy delivery to filtering capacitor 18 is complete before the feedback control circuit can produce a signal to turn transistor 13 on again. This initial decrease is illustrated by the portion of curve 42 between points 44 and 45. If it is assumed that virtually all the stored energy is successfully delivered to the output circuit, then the stored energy must exceed the energy taken by the load both during the time energy is being stored in the magnetic field of the inductive circuit and during the time energy is delivered from the inductive circuit via winding 17 to the output circuit. This excess energy will then be used by the load during the stable quiescent period of the inductive circuit, for example, between the times 44 and 45 for the solid-line curves shown in FIG. 2.

The preferred embodiment of the invention holds both the "on" time, $t_{on}$, of transistor 13 and the delivery time, $t_d$, of the inductive circuit substantially constant and holds the peak primary current, $I_p$, of winding 23 substantially constant. This results from the unchanging forward impedance of the regenerative feedback loop consisting of resistor 15, diode 22, and winding 16 during the increase of current in primary winding 23. As the loading at terminals 11 and 12 varies, the voltage across resistor 15 changes; but its greatest magnitude will be considerably less than the voltage of regenerative feedback winding 16 at the time regenerative switch-off begins because its only function is to exceed that emitter-to-base voltage above which the loop gain exceeds unity in order to turn transistor 13 on at the appropriate point in the output voltage wave. Thus, variations of the peak base current of transistor 13 and of the peak current in primary winding 23 are definitely second order effects. The "on" time, $t_{on}$, of transistor 13 and the delivery time, $t_d$, of the inductive circuit are directly related to the peak current, $I_p$, in primary winding 23 and are correspondingly constant.

Therefore, for the highest expected power requirements of a load, $P_L'$, the primary winding inductance, $L_p$, must exceed a critical value in order for a stable quiescent state of the magnetic circuit to exist. That is, $$L_p > \frac{2P_L'(t_{on}+t_d)}{I_p^2}$$

This relationship holds true so long as there is little waste of the stored energy. Optionally, power losses attributable to such waste may be added to $P_L'$. However, the relationship might advantageously be expressed in other forms if $t_{on}$, $t_d$, and $I_p$ are allowed to vary with load power. In the preferred embodiment of the invention, no power output exceeding $P_L'$ can be sustained for then no stable quiescent state of inductive circuit remains and the control range has been entirely used up.

The simplifying, but nonessential, assumption of low energy waste can be satisfied in the following manner. Resistive heating in the regenerative feedback loop during energy delivery from output winding 17 to filtering capacitor 18 can be made negligible by making the sum of resistance 15 and resistance 21 extremely large. The induced voltage of regenerative feedback winding can then produce only insignificant current and heating in these resistances, with the result that nearly all of the stored energy must be delivered to the output circuit via output winding 17. Resistance 21 can be made large because diode 22 eliminates it from the regenerative feedback loop when buildup of a large base current is desired, that is, when transistor 13 is again forward-biased by the feedback control circuit. Paradoxically, low resistance in the latter part of the cycle also means low energy waste in that part of the cycle because a certain peak base current is required. It should be noted that low energy waste has intrinsic value quite aside from the relevance of the above-described arrangement of resistor 21 and diode 22 to maintenance of the stable quiescent state, which relevance will now be described.

At the time junction 19 ceases to rectify, a small residual amount of energy is stored in the distributed capacitances of windings 16, 17, and 23. This energy will tend to cause small, very high frequency oscillations commonly called parasitic oscillations, within those windings. This oscillation in regenerative feedback winding 16 can be held below an amount which would shock-excite transistor 13 to commence a new cycle of high current conduction because transistor 13 has a small dead-band, that is, a range of emitter-to-base voltages beginning at zero for which the loop gain of transistor 13 and its regenerative feedback circuit is less than unity.

The parallel combination of diode 22 and resistance 21 greatly facilitates keeping these residual oscillations of winding 16 within the dead-band of transistor 13 because it allows an increase of the internal damping of winding 16 beyond that otherwise obtainable. This may be explained as follows. Resistance 21 and diode 22 present a high impedance and reduce energy losses during reverse biasing of transistor 13, but they present an impedance to its base current during forward biasing which is much lower than heretofore possible. Therefore, a smaller induced voltage in regenerative winding 16 will produce the required peak base current of transistor 13. A smaller induced voltage means that fewer turns of wire are needed on regenerative feedback winding 16 and that a lower ratio of inductance to resistance in winding 16 is allowable. Thus, the residual parasitic oscillations may be more nearly critical damped than otherwise possible. Thus, discharge of the stored energy of the distributed capacitance of regenerative winding 16 is prevented from forward-biasing transistor 13 beyond its dead-band.

Therefore, the inductive circuit remains in a stable quiescent state from point 44 to point 45 of the solid-line curves of FIG. 2.

To determine where point 45 lies with respect to the output ripple voltage, as shown in curve 42 of FIG. 2, it is necessary to recognize the role played by capacitor 27. In its absence, the base-emitter junction of transistor 14 would be forward-biased when the magnitude of the predetermined portion of the output voltage became less than the magnitude of the reference voltage across Zener diode 26. The predetermined portion of the output voltage is the output voltage divided by K, where K is the ratio of the total resistance of voltage divider 28 to the resistance of that portion between the base of transistor 14 and terminal 12. However, capacitor 27 and the portion of the resistance of voltage divider 28 which is between the base of transistor 14 and output terminal 12 apply to the base of transistor 14 an incremental voltage in addition to the predetermined portion of the output voltage, which incremental voltage is proportional to the derivative of the output voltage if the product of the aforesaid capacitance and the aforesaid portion of resistance, as shunted by the base-emitter impedance of transistor 14, is much less than the average duration of the stable quiescent state. The base-emitter impedance of transistor 14 will be quite high until the turn-on point is reached. When the magnitude of the output voltage is decreasing, the magnitude of the incremental voltage is subtracted from the magnitude of the predetermined portion of the output voltage by connecting capacitor 27 across the portion of the output voltage which is not opposed to the reference voltage appearing across Zener diode 26 in the base-emitter circuit of transistor 14. Its charging and discharging currents will then cause the voltage at the base of transistor 14 to anticipate any trend of the output voltage. Thus, as terminal 11 becomes progressively less negative with respect to terminal 12, the discharging current of capacitor 27 will raise the potential of the base of transistor 14 more than if capacitor 27 were absent. The value of capacitance, $C_D$, of capacitor 27 is chosen by recognizing that there will be no incremental voltage at zero load, since there will then be no change in the output voltage. Therefore, the product of the resistance ratio, K, of voltage divider 28 and the reference voltage, that is, $KV_{REF}$, must lie at the bottom of the output voltage ripple, as shown in curves 42 and 42A of FIG. 2, if satisfactory regulation is to be obtained throughout the design control range. Further, it will be observed that the incremental voltage must be equal to the amount that the output voltage will fall during the "on" time, $t_{on}$, of transistor 13. Once the value, $C_D$, of capacitor 27 is chosen, say, at normal load, the two aforesaid voltage quantities will be equal for all loads if the decrease of the output voltage is essentially linear, if the time constant associated with capacitor 27 and the predetermined portion of resistor 28 is sufficiently small, and if the energy storage time, $t_{on}$, of the inductive circuit does not vary with load. The validity of all these assumptions has been discussed above. Then, as will now be more fully described, the bottom of the ripple voltage will lie at $KV_{REF}$, the top of the ripple voltage will lie at a constant value above that, and the average value, or direct-current component, of the output voltage will be constant.

More specifically, if now the loading of the output circuit is increased so that the voltage across terminals 11 and 12 decreases more rapidly than normally, as illustrated in curve 42A of FIG. 2, transistor 14 will be forward-biased at an earlier time than for normal loading. It should be noted that the turn-on time for normal loading is chosen to coincide with the time the output voltage passes through its average value merely for convenience in illustration. No physical relationship requires this coincidence. The base-to-emitter voltage of transistor 14 has one component which is proportional to the difference between the predetermined portion of the output voltage and the reference voltage and another component which is proportional to the rate of change of the output voltage. For the increased loading, the rate of change of the output voltage will be greater than it was for the previous condition of loading. If the output voltage falls off "X" times as rapidly as previously and thus would decline "X" times as far as previously during the "on" time, $t_{on}$, of transistor 13, that is, if in curves 42 and 42A of FIG. 2, the length of the line segment MN equals "X" times the length of the line segment PQ, the component of base-to-emitter voltage of transistor 14 which is proportional to the rate of change of the output voltage will be "X" times as great as previously because the slope of the declining portion of curve 42A is "X" times the slope of the declining portion of curve 42, since $t_{on}$ is constant, and will cause transistor 14 to conduct when the output voltage is "X" times as far above $KV_{REF}$ as previously. This phenomenon is illustrated by curve 42A of FIG. 2 and by the corresponding position of curve 40A of FIG. 2. A new cycle of increasing current in primary winding 23 commences at point 48, at which time the output voltage is further above $KV_{REF}$ than it would have been at point 45 in a ratio, $$\frac{MN}{PQ}$$

which is equal to the ratio of the negative slopes, or derivatives, of curves 42A and 42. As a consequence, the output voltage should just equal $KV_{REF}$, as shown in curve 42A, at the time, at point 49 of the dashed curves of FIG. 2, when a new period of delivery of stored energy from the magnetic circuit to the output circuit commences.

Although the signal now generated by transistor 14 will become greater by time 49, because of the greater derivative signal, than its signal was at the end of the first current conduction cycle at time 43, there will not be a significant increase in the peak current in primary winding 23 as compared to the previous cycle because resistance 15 remains constant throughout the buildup of current in primary winding 23 and the voltage across resistance 15, which is induced by the collector current of transistor 14, is relatively insignificant compared to the regenerative voltage of winding 16, as discussed above. The voltage which transistor 14 induces in resistance 15 need be great enough only to turn on transistor 13 at the appropriate point in the output voltage wave form.

The function of transistor 14 and its associated circuits is one of timing rather than providing any appreciable power for the control correction. When the new cycle of high current conduction in primary winding 23 comes to an end, the increase of voltage across capacitor 18 and the load circuit will be substantially the same as for normal load, as illustrated by the portion of curve 42A of FIG. 2 between points 49 and 50. Thus, the magnitude of the periodic fluctuation, or ripple, of the output voltage will remain substantially constant.

A further result of holding the peak primary winding current, and hence the conduction period of transistor 13 and winding 23, substantially constant, is that the frequency of operation of switching transistor 13 increases as loading becomes heavier and decreases as loading becomes lighter. Thus, hysteresis and eddy current losses in the magnetic circuit are reduced at light loads. On the other hand, an upper limit can be set on hysteresis and eddy current losses for heavy loads because the frequency of operation cannot be increased beyond the point at which a new cycle of high current conduction in primary winding 23 commences immediately after rectification in the output circuit of winding 17, junction 19, and capacitor 18 ceases.

A further result of this characteristic is that the circuit provides protection against overloads. The output power taken by load 30 can be increased only to a certain point. In other words, an increasing load is satisfied by small bursts of energy delivered at an increasing frequency rather than by bursts of energy which increase in magnitude as loading increases; maximum power comes when the small bursts are packed as closely together as possible.

The accuracy of the timing of the commencement of a new cycle of high current conduction in primary winding 23 is facilitated both by the use of a regulated reference voltage provided across Zener diode 26, which voltage is isolated both from fluctuations of input voltage 10 and the output voltage across terminals 11 and 12, and by the rate-sensing function performed by capacitor 27. The accuracy of timing of switching of the oscillating transistor is more important when the switching transistor oscillates in the mode described herein than when it operates by increasing the primary winding peak current to satisfy increasing loads. In particular, the use of an isolated reference voltage means that the stable quiescent period will be varied to compensate for fluctuations in the input voltage of source 10, as well as for loading changes. The voltage polarities of the circuit of FIG. 1, and the conduction types of the transistors might be changed. In fact, entirely different semiconductor devices might be employed to practice the invention, as described above in reference to the components.

Also worthy of note is the fact that certain advantages of the invention may be sacrificed in order to obtain or emphasize other advantages. Thus, a constant frequency converter might be devised by allowing a carefully calculated continuous decrease in resistance 15 of the feedback circuit as the signal from transistor 14 increases, even though the magnitude of the ripple voltage might vary.

A related direct-current voltage converter circuit is disclosed in the copending application, Serial No. 159,242, filed December 14, 1961 for the invention of R. J. Projain.

In all cases it is understood that the above-described arrangements are illustrative of a small number of the many possible specific embodiments which can represent applications of the principles of the invention. Numerous and various other arrangements can readily be devised in accordance with these principles by those skilled in the art without departing from the spirit and scope of the invention.

What is claimed is:

1. Direct-current voltage converter apparatus comprising an input to which a direct-current voltage may be applied, an output including a rectifier-filter for producing a load direct-current voltage, and a transistor oscillator connected between said input and said output, said transistor oscillator comprising a power transistor having emitter and collector electrodes connected across said input and having a base electrode, a transformer having a primary winding connected in series with said power transistor emitter and collector electrodes across said input, said transformer having a secondary winding connected across said rectifier-filter and a feedback winding connected across said power transistor base and emitter electrodes and oriented for promoting base current when current in said primary winding is increasing, a comparator transistor having collector, emitter and base electrodes, means for producing a stabilized reference voltage, said reference voltage means being connected across said comparator transistor base and emitter electrodes and oriented for promoting conduction between said comparator transistor base and emitter electrodes, a first circuit connected across said output and connected in series with said reference voltage means between said comparator transistor base and emitter electrodes for opposing said reference voltage by a decreasing amount as said load voltage decreases, a first diode connected across said power transistor emitter and base electrodes and oriented for preferentially conducting currents which reverse bias said power transistor emitter and base electrodes, a first resistance connected in series with said feedback winding and said first diode for limiting current flow through said first diode, a second diode connected across said first resistance and oriented for preferentially conducting base current of said power transistor, said feedback winding having a winding resistance proportioned for substantially damping parasitic oscillations in said feedback winding, and a second circuit connecting said comparator transistor emitter and collector electrodes in series with said reference voltage means across said power transistor base and emitter electrodes for initiating conduction between said power transistor base and emitter electrodes whenever the decrease of said load voltage initiates conduction between said comparator transistor base and emitter electrodes.

2. Apparatus according to claim 1 wherein the first circuit for opposing the reference voltage comprises a voltage divider having first and second terminals connected across said output and a tap between said first and second terminals, said tap and said first terminal being connected in series with said reference voltage means between said comparator transistor base and emitter electrodes in opposing voltage polarity, and a capacitor connected between said tap and said second terminal, said capacitor and the portion of said voltage divider between said tap and said first terminal having a capacitance-resistance product for producing a current in said capacitor which is substantially proportional to the rate of decrease of said load voltage.

3. Direct-current voltage converter apparatus comprising an input to which a direct-current voltage may be applied, an output including a rectifier-filter for producing a load voltage, and a transistor oscillator connected between said input and said output, said transistor oscillator comprising a power transistor having emitter and collector electrodes connected across said input and having a base electrode, a transformer having a primary winding connected in series with said power transistor emitter and collector electrodes across said input, said transformer having a secondary winding connected across said rectifier-filter and a feedback winding connected across said power transistor base and emitter electrodes and oriented for promoting base current in said power transistor when current in said primary winding is increasing, a comparator transistor having collector, emitter and base electrodes, means for producing a stabilized reference voltage, said reference voltage means being connected across said comparator transistor base and emitter electrodes and oriented for promoting conducting between said comparator transistor base and emitter electrodes, a voltage divider having first and second terminals connected across said output and a tap between said first and second terminals, a portion of said voltage divider between said tap and said first terminal being connected in series opposition with said reference voltage means between said comparator transistor base and emitter electrodes, a capacitor connected between said tap and said second terminal, said capacitor and said portion of said voltage divider between said tap and said first terminal having a capacitance-resistance product substantially smaller than the period of an oscillation cycle, a first diode connected across said power transistor emitter and base electrodes and oriented for preferentially conducting currents which reverse bias said power transistor emitter and base electrodes, a first resistance connected in series with said feedback winding and said first diode for limiting current flow through said first diode, a second diode connected across said first resistance and oriented for preferentially conducting base current of said power transistor, said feedback winding having a winding resistance proportioned for substantially damping parasitic oscillations in said feedback winding, and a second resistor having substantially constant resistance connected in series with said feedback winding and said second diode across said power transistor base and emitter electrodes, said second resistor also being connected in series with said reference voltage means across said comparator transistor emitter and collector electrodes.

References Cited in the file of this patent
UNITED STATES PATENTS

| | | |
|---|---|---|
| 2,854,614 | Light | Sept. 30, 1958 |
| 2,968,738 | Pintell | Jan. 17, 1961 |

OTHER REFERENCES

"Transistor Power Supplies," by L. H. Light, published in Wireless World (December 1955), pages 582–586.